United States Patent [19]
Marsi

[11] Patent Number: 5,961,122
[45] Date of Patent: Oct. 5, 1999

[54] SPLIT MECHANICAL FACE SEAL AND METHOD OF ASSEMBLY THEREOF

[75] Inventor: Joseph A. Marsi, Rolling Hills Estates, Calif.

[73] Assignee: Flowserve Management Company, Irving, Tex.

[21] Appl. No.: 08/967,117

[22] Filed: Nov. 12, 1997

Related U.S. Application Data

[63] Continuation of application No. 08/684,447, Jul. 19, 1996, abandoned, which is a continuation-in-part of application No. 08/505,027, Jul. 21, 1995, abandoned.

[51] Int. Cl.$^6$ .................................................. F16J 9/00
[52] U.S. Cl. .......................... 277/306; 277/370; 277/390; 277/397; 277/910
[58] Field of Search .................................. 277/306, 370, 277/371, 390, 397, 910

[56] References Cited

U.S. PATENT DOCUMENTS

| | | |
|---|---|---|
| 281,760 | 7/1883 | Gingras . |
| 766,882 | 8/1904 | Hart . |
| 1,398,439 | 11/1921 | McMaster . |
| 1,833,887 | 12/1931 | Andrews . |
| 2,768,036 | 10/1956 | Greenough . |
| 3,245,693 | 4/1966 | Way . |
| 3,288,164 | 11/1966 | Clark . |
| 3,580,765 | 5/1971 | Grove . |
| 4,251,083 | 2/1981 | Montes . |
| 4,290,615 | 9/1981 | Etcheverry . |
| 4,327,921 | 5/1982 | Reinsma et al. . |
| 4,415,164 | 11/1983 | Johnson . |
| 4,538,820 | 9/1985 | Duffee . |
| 4,568,091 | 2/1986 | Harrison . |
| 4,576,384 | 3/1986 | Azibert . |
| 5,067,733 | 11/1991 | Nagai et al. ............................ 277/11 |
| 5,114,163 | 5/1992 | Radosav et al. . |
| 5,192,085 | 3/1993 | McOnie . |
| 5,201,531 | 4/1993 | Lai ...................................... 277/96.1 |
| 5,294,132 | 3/1994 | Duffee et al. . |
| 5,662,340 | 9/1997 | Bessette et al. . |
| 5,716,054 | 2/1998 | Duffee et al. ......................... 277/81 S |

FOREIGN PATENT DOCUMENTS

| | | |
|---|---|---|
| 207706 | 9/1966 | Sweden . |
| 141704 | 3/1961 | U.S.S.R. . |
| 715872 | 2/1980 | U.S.S.R. . |
| 1809890 | 4/1993 | U.S.S.R. . |
| 0476019 | 11/1937 | United Kingdom . |
| 917693 | 2/1963 | United Kingdom . |
| 1142327 | 2/1969 | United Kingdom . |

*Primary Examiner*—Daniel G. DePumpo
*Attorney, Agent, or Firm*—Christie, Parker & Hale, LLP

[57] ABSTRACT

A split mechanical face seal assembly for mounting around a shaft, and having two holder halves, each of the two holder halves having first and second axial ends, each first end defining a counterbore formed therein, a seal face half received in the counterbore of each of the two holder halves, a resilient mounting in the counterbore of each of the two holder halves to seal the respective seal face half relative to its holder half, a resilient member in the counterbore of each of the two holder halves biasing the seal face half outwardly of its counterbore, a separate split retainer ring half located between and engaging each biasing means and its respective seal face half and an annular member for securing the two holder halves to each other around the shaft. A method of assembling and installing a split mechanical face seal around a shaft that extends from a housing.

30 Claims, 6 Drawing Sheets

SPLIT MECHANICAL FACE SEAL AND METHOD OF ASSEMBLY THEREOF

CROSS-REFERENCE

The present application is a continuation of Ser. No. 08/684,447 filed on Jul. 19, 1996, now abandoned, which is a continuation-in-part of Ser. No. 08/505,027, filed on Jul. 21, 1995, entitled SPLIT O-RING FOR SPLIT MECHANICAL FACE SEAL, now abandoned.

BACKGROUND OF THE INVENTION

This invention relates to split mechanical face seals and, in particular, to split mechanical face seals that can be installed relative to a shaft without disassembly of attendant equipment.

DESCRIPTION OF RELATED ART

Various forms of sealing devices have been used between stationary housing members and rotating shafts. These types of devices range from various braided and compressed packings to different types of end face mechanical seals. The end face mechanical seals are generally "leak-free" and are therefore preferred to the braided and compressed packings which usually have a measurable volume of leakage. However, the braided and compressed packings are often used for equipment requiring either a long period of time to disassemble or special equipment to disassemble.

Various designs of end face mechanical seals which are split along a diametric plane have previously been offered to allow installation without disassembly of the attendant equipment. The purpose of such devices had been to reduce the leakage associated with the packings. One such device is described in U.S. patent application Ser. No. 08/374,325 filed Jan. 18, 1995 by Duffee and Ard, incorporated by reference herein. In that device, a shaft seal of the mechanical face seal type is split along a diametric plane thereof and which therefore can be installed relative to a shaft without disassembly of attendant equipment. The stationary and rotating components of the seal each may have seal face halves assembled in corresponding split annular holders. Thereafter, the assemblies may be relatively axially shifted along the shaft toward engagement with each other and mounted in operative association with each other within a diametrically split gland housing. Split O-rings are located between the seal face halves and their respective split annular holder half elements for forming a fluid tight seal between the parts. Split O-rings are also located between the rotating annular holder and the shaft and between the stationary annular holder and the split gland housing.

A problem of the above-described diametric plane split mechanical face seal is that its numerous component parts make it difficult to assemble and install on and around a shaft. Another problem involves leakage of the split O-rings at their abutting ends due to improper engagement against each other. For example, during assembly, when the respective stationary and rotating component half elements are brought together, one or more ends of the split O-rings may become cut, frayed or displaced by the sharp, hard edges of the annular holder half elements or seal face halves. In addition, friction between the ends of the split O-rings and their receiving grooves, during assembly, may inhibit proper sealing contact between the corresponding ends of the split O-rings.

Another split mechanical face seal is described in U.S. Pat. No. 4,576,384 to Azibert. In this seal, the stationary seal face halves are mounted directly to the gland housing, i.e., a separate holder for holding the stationary seal face halves within the gland housing is omitted. In addition, the seal uses O-rings having ball-socket type fastening mechanisms. This seal, however, also has its disadvantages. In particular, the seal is difficult to assemble and install because the component parts of the rotating and stationary assemblies, i.e., the holder halves, the rotating and stationary seal face halves and the respective O-rings, are all loose pieces that are not pre-assembled. The O-rings are particularly difficult to deal with because they need to be stretched and fit over the respective pairs of seal face halves after the halves are mounted around the shaft.

In view of the above, it should be appreciated that there is still a need for a split mechanical face seal that is relatively easy to assembly and install and that has improved sealing capability.

SUMMARY OF THE INVENTION

The present invention is embodied in a relatively easy to assemble and install split mechanical face seal having a specially designed split O-ring that results in reduced damage to the O-ring during assembly and reduced leakage through the seal.

The split mechanical face seal of the present invention includes split rotating and stationary split ring holders, each holder having opposing and remote axial ends, said opposing ends defining counterbores formed therein. Split rotating and stationary ring seal faces are loosely received in the counterbores of the rotating and stationary holders, respectively, and include opposing contacting seal surfaces. O-ring seals are mounted in the counterbores of the rotating and stationary holders, which bias the rotating and stationary ring seal faces, respectively, toward coaxial positions in their counterbores. The O-ring seals also yieldingly key the rotating and stationary ring seal faces within their counterbores against axial withdrawal therefrom.

A feature of the present invention is that the stationary holder includes springs for yieldingly biasing the stationary seal face outwardly of the stationary holder counterbore and the springs are retained in the counterbore by a split retaining ring. Alternatively, the springs and retaining ring may be located in the rotating holder counterbore. An advantage of this feature is that each half of the rotary seal face assembly and each half of the stationary seal face assembly may be fully assembled before mounting to the shaft. This results in a much easier installation procedure because there are only two parts to each assembly, excluding fasteners, that are manipulated during installation.

Another feature of the present invention is that one or more of the split O-rings has a first end that is tapered and a second end that has a groove that closely corresponds in shape to the tapered first end such that said ends provide a tight seal when the respective half annular segments are assembled. An advantage of this feature is that the tapered first end of the O-ring is guided into contact with the second end of the O-ring with reduced frictional resistance and reduced fraying during assembly.

Other features a nd advantages of the present invention will become apparent from the following description of the preferred embodiments, taken in conjunction with the accompanying drawings, which illustrate, by way of example, the principals of the invention.

BRIEF DESCRIPTION OF THE DRAWINGS

The accompanying drawings illustrate the invention. In such drawings.

DESCRIPTION OF THE PREFERRED EMBODIMENT

Referring now more specifically to FIGS. 1–8, the numeral 10 generally designates a preferred split seal assembly, utilized in conjunction with a rotary shaft 12 and a stationary housing portion 14. The housing portion 14 defines an opening 16 therein through which the shaft 12 projects and which opens through a seal face 18 extending about the opening 16. A split gland housing referred to generally by the reference numeral 20 is provided and includes two preferably identical halves 22 and 24 defining an opening 26 therethrough of a first small diameter as at 28 on the inner end thereof and a second large diameter as at 30 on the outer end thereof. The housing 20 defines first and second axially spaced inner and outer end annular recesses 32 and 34 spaced inwardly from the opposite axial ends of the housing 20 and separated axially by an annular rib portion 36.

Figure 2:
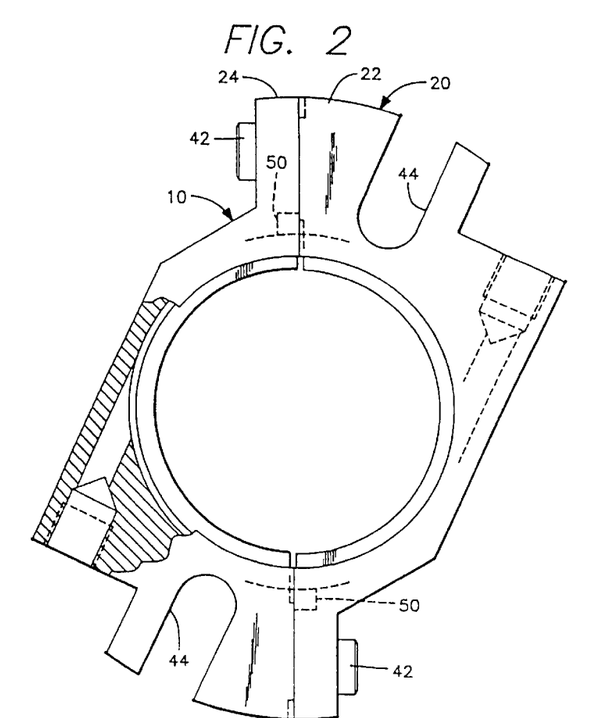
FIG. 2 is an outside end elevational view of the split gland housing of the instant invention as shown in FIG. 1 with portions thereof broken away and illustrated in vertical section.
Figure 3:
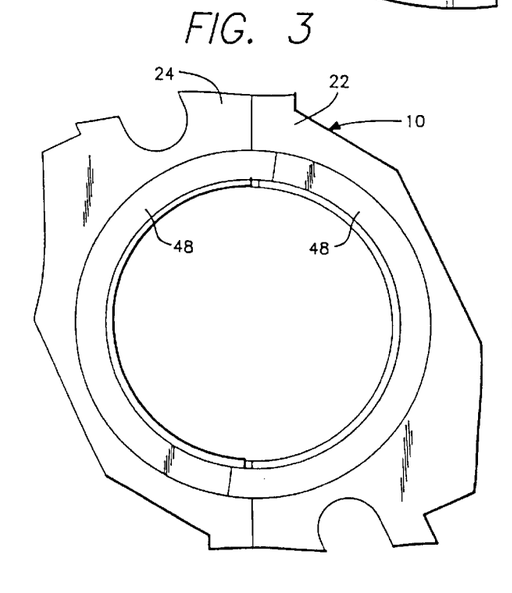
FIG. 3 is an inside end elevational view of the split gland housing of the assembly shown in FIG. 1.

The halves 22 and 24 each include a pair of smooth bores 38 and a pair of threaded bores 40 equipped with counterbores. As shown in FIG. 2, shouldered bolts 42 are utilized to tightly secure the halves 22 and 24 together. The halves 22 and 24 further include mounting slots 44 by which mounting bolts 46 may be used to tightly clasp the assembled housing 20 to the stationary housing portion 14, and diametrically split seal halves 48 are clamped between the stationary housing portion 14 and the assembled split gland housing 20. An expanded teflon cord material such as made by Gortex may be used instead of the split seal halves. In addition, each housing half 22 and 24 includes a recess 50 which opens through one radial mounting face thereof, only one of the recesses 50 being utilized in a manner to be hereinafter more fully set forth. Still further, the other radial mounting face of each housing half 22 and 24 includes an L-shaped relieved area 52 in which a similar L-shaped flat seal 54 is partially recessed for compressive sealing between the halves 22 and 24 when the latter are bolted together through the utilization of the bolts 42.

Figure 8:
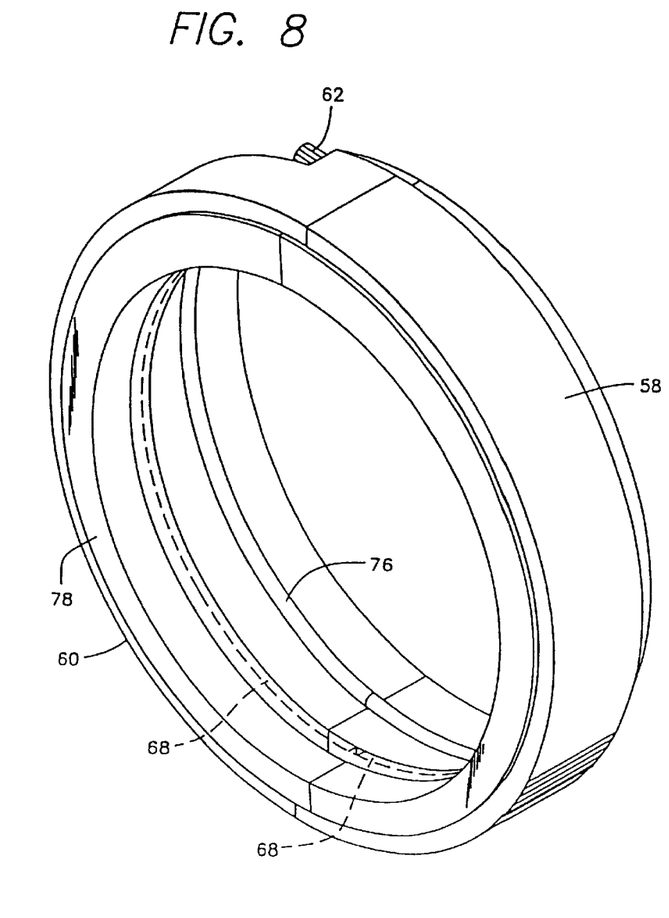
FIG. 8 is an outside end perspective view of the rotary seal component of the assembly shown in FIG. 1.

The seal assembly 10 includes a diametrically split first seal face holder 56 comprising a pair of identical holder halves 58 and 60 removably circumferentially joined together through the utilization of a pair of bolts 62 similar to bolts 42, as shown in FIG. 8. The holder 56 defines a bore 64 formed therethrough for tight clamping engagement with the shaft 12 (see e.g. pin 305 in FIG. 12) and further defines an outer end counterbore 66 in which a pair of one half annular, compressible and non-resilient strips 68 (preferably teflon) is seated. In addition, the holder 56 further defines an inwardly opening circumferential groove 70 in which a diametrically split O-ring seal 72 is partially seated. The holder 56 also defines a radially inwardly opening circumferential groove 74 opening into the bore 64 and in which a diametrically split O-ring seal 76 is compressively seated by the shaft 12 in order to form a fluid tight seal between the shaft 12 and the holder 56.

A diametrically split rotary seal face 78 is snugly received within the counterbore 66 and includes an outer circumferential groove 80 in which the O-ring seal 72 also is compressively seated. Further, the rotary seal face 78 is seated against the strips 68, and the seal face 78 includes a sealing surface 82 normal to the center axis of the shaft 12.

Figure 6:
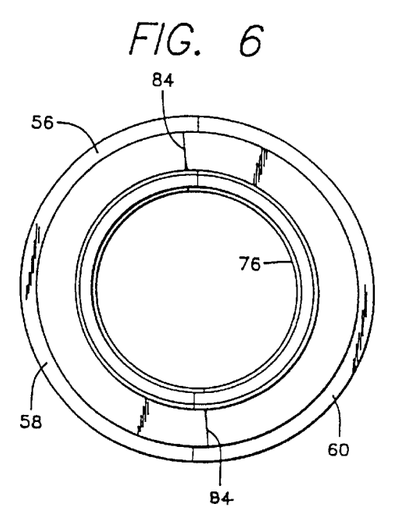
FIG. 6 is an outside end elevational view of the rotary seal component of the assembly shown in FIG. 1.

The seal face 78 is originally constructed of one piece and diametrically fractured as at 84, see FIG. 6. The O-ring 72 not only seals the seal face 78 relative to the holder 56 but also locks the rotary seal face within the counterbore 66 against more than minimal axial shifting therein.

Figure 1:
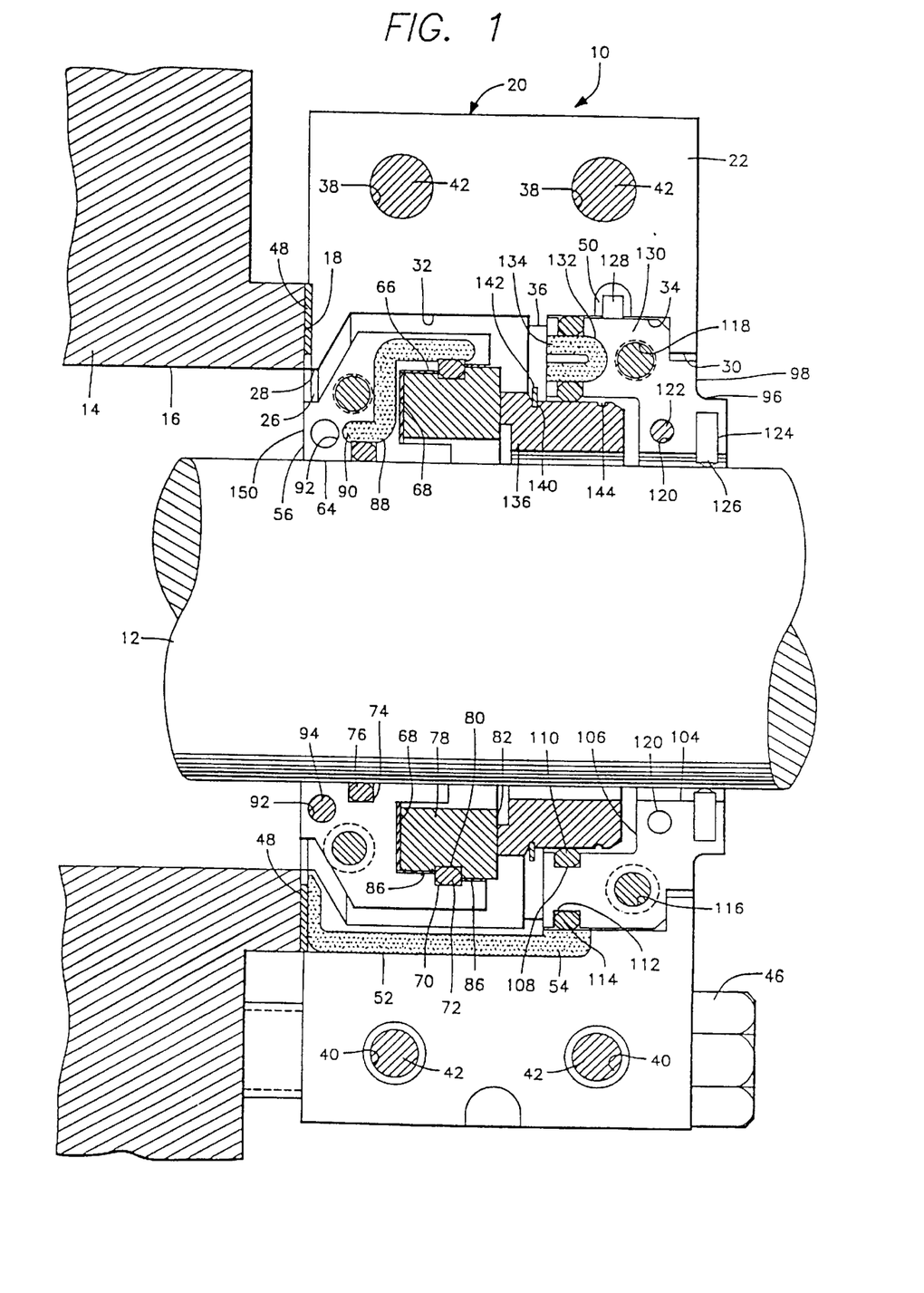
FIG. 1 is a vertical sectional view taken substantially upon a plane passing through the longitudinal center line of a preferred split seal assembly constructed in accordance with the present invention.

As the seal face halves 78 are installed within the halves 58 and 60 of the holder 56, thin resilient strips 86 may be interposed between the walls of the counterbore 66 and the outer peripheral portions of the halves of the rotary seal face 78 on either side of the circumferential groove 70, see FIG. 1. These strips 86, if used, are mounted perpendicularly to the diametric plane along which the rotary seal face is fractured and the halves of the O-ring seals 72 and 76 are slightly offset circumferentially from the diametric mating surfaces of the seal face holder 56. The diametric plane in which the rotary seal face 78 is fractured is also oppositely offset annularly relative to the diametric plane of the mating surfaces of the holder halves 58 and 60. Thus, it may be seen that the first seal face holder 56 may have the components of each half thereof relatively assembled and then the two halves 58 and 60 may be engaged about the shaft 12 and joined through utilization of the bolts 62. One mating surface of each half 58 and 60 includes a generally Z-shaped recess 88 formed therein in which a flat similarly Z-shaped compressible gasket 90 is seated whereby the mating faces of the halves 58 and 60 are sealed relative to each other. Further, it will be noted that the gaskets 90 are each sealed relative to the O-ring seals 72 and 76. In addition, each half 58 and 60 includes a bore 92 formed therein opening outwardly of the mating surface thereof, and one of the bores 92 has a positioning pin 94 seated therein and projecting outwardly therefrom for reception within the opposing bore 92.

Figure 4:
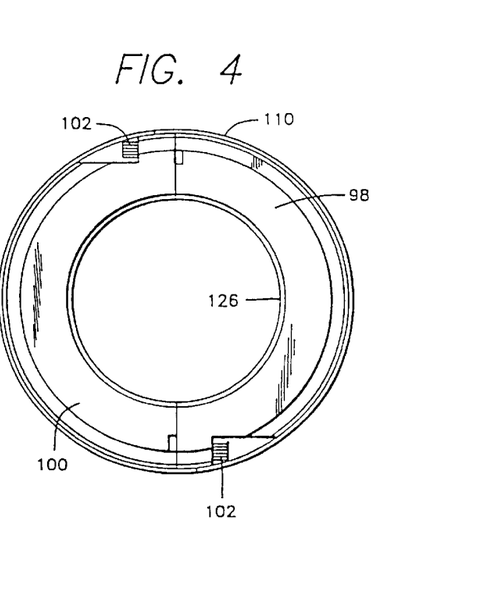
FIG. 4 is an outside end elevational view of the stationary seal components of the assembly shown in FIG. 1.
Figure 5:
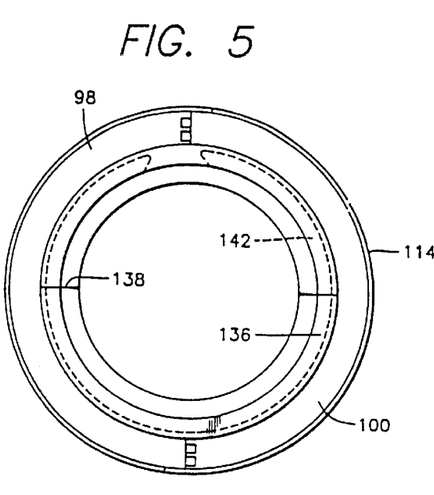
FIG. 5 is an inside end elevational view of the stationary seal components of the assembly shown in FIG. 1.
Figure 7:
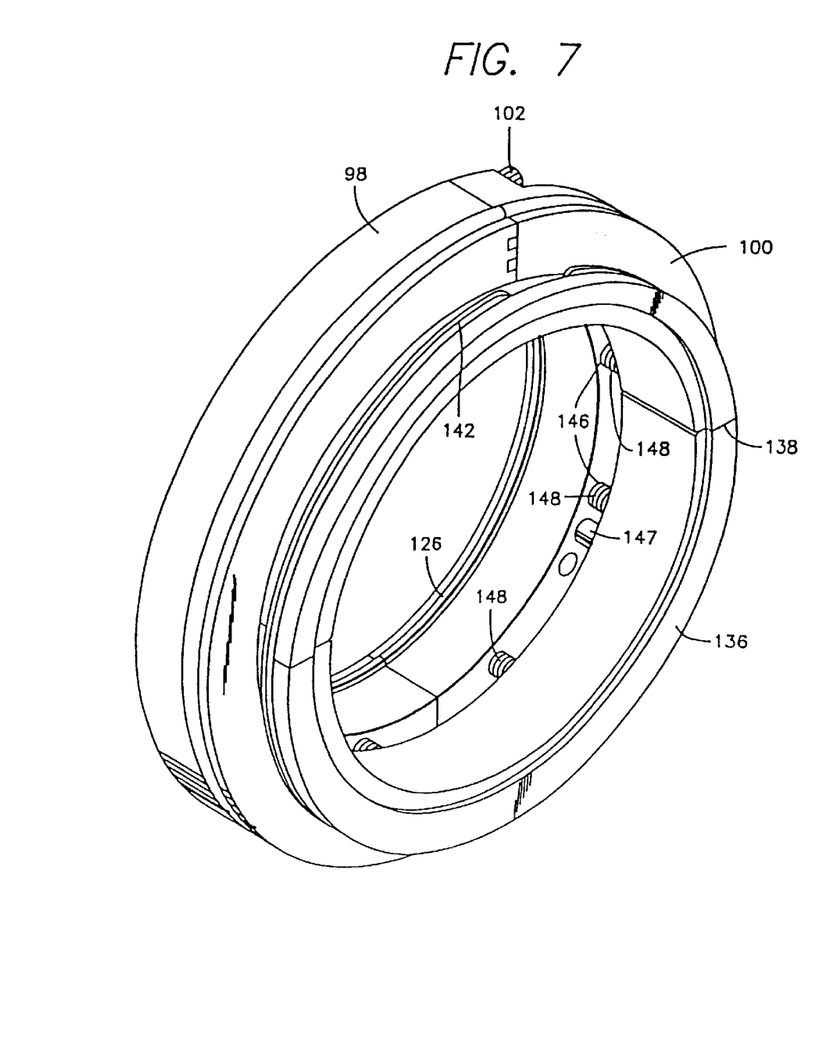
FIG. 7 is an inside end perspective view of the stationary seal component of the assembly shown in FIG. 1.

The split seal assembly 10 further includes a second seal face holder 96 which is annular and diametrically split to form a pair of holder halves 98 and 100 removably circumferentially joined together through the utilization of a pair of bolts 102 corresponding to the bolts 62 and 42, as shown in FIGS. 4 and 7. The halves 98 and 100 define a bore 104 formed therethrough including an inner end counterbore 106. The counterbore 106 includes a circumferential inwardly opening groove 108 in which a diametrically split O-ring 110 is partially received. Further, the outer periphery of the holder 96 defines an outer peripheral groove 112 in which a diametrically split O-ring 114 is partially received. The halves 98 and 100 preferably are identically formed and each includes a smooth bore 116 and a threaded bore 118 through which and in which the bolts 102 are received and threadedly engaged for securing the halves 98 and 100 together. In addition, each half 98 and 100 includes a bore 120 opening outwardly through the mating face thereof and one of the bores 120 includes a positioning pin 122 seated therein and projecting outwardly therefrom for keying engagement in the other positioning bore 120.

Also, the holder 96 defines an inner circumferential groove 124 opening into the bore 104 and in which a diametrically split carbon centering bushing 126 is seated. The centering bushing includes an inner periphery having a diameter substantially equal to the diameter of the shaft 12. The holder half 98 includes a radially outwardly projecting locator pin 128 receivable within the recess 50, and each of the sealing surfaces 130 of the halves 98 and 100 includes a U-shaped relieved area in which a flat, resilient and U-shaped flat seal 134 is partially seated.

A stationary seal face 136 is provided. The seal face 136 is originally constructed in annular form, but is fractured along a diametric plane as at 138. The seal face 136 may include a narrow outer peripheral groove 140 in which a narrow snap ring 142 may be seated in order to releasably secure the seal halves together to form the unitary seal face 136. The outer periphery of the seal face 136 additionally may include a second annular groove 144 for a purpose to be hereinafter more fully set forth.

Each of the holder halves 98 and 100 includes a plurality of circumferentially spaced blind bores 146 opening into the counterbore 106 and having corresponding ends of a plurality of expansion springs 148 seated therein. Further, one of the halves 98 and 100 includes a positioning pin 147 projecting outwardly therefrom and loosely slidably received in an opposing blind bore (not shown) formed in the seal face 136 to thereby key the seal face 136 and the holder 96 against relative rotation. See FIG. 7. The seal face 136 initially is snugly received within the counterbore 106 to an extent with the O-ring 110 having its inner periphery removably seated in the groove 144 to thereby yieldably prevent relative axial shifting between the seal face 136 and the holder 96.

It may be seen that the O-ring 110 provides a seal between the stationary seal face 136 and the holder 96, that the U-shaped flat seal 134 forms a seal between the O-ring 110 and the O-ring 114 and that the O-ring 114 forms a seal between the holder 96 and the housing 20. Furthermore, the O-ring 114 seals relative to the flat seal 54, and the spacing between the legs of the flat seal 134 comprises spacing for expansion of the legs of the flat seal 134 independent of deflection of the contacting portions of the O-rings 110 and 114 when the halves 98 and 100 are tightly bolted together about the shaft 12.

When installing the split seal assembly, the halves 58 and 60 of the first seal face holder 56 have their corresponding components 68, 72, 76, 78, 86 and 90 secured together and each of the halves 58 and 60 is separately engaged about a corresponding side of the shaft 12. Thereafter, the holder 56 is properly positioned along the shaft 12 with the inner end face 150 thereof registered with the seal face 18 of the housing portion 14 and the bolts 62 are then tightened. The two halves of the seal face 136 are then assembled loosely about the shaft 12 and the snap ring 142 is seated in the groove 140 in order to maintain the two halves of the stationary seal face secured together about the shaft 12.

Next, the two halves 98 and 100 of the second seal face holder 96 have the corresponding components 110, 114, 126, 134 and 148 assembled and the two halves 98 and 100 are loosely positioned about the shaft 12 and secured together through the utilization of the bolts 102 with the holder 96 axially spaced from the stationary seal face 136 and the latter axially spaced from the rotating seal face 78. Then, after the bolts 102 have been properly tightened, the holder 96 is axially shifted toward the stationary seal face 136 such that the latter is loosely received in the counterbore 106 to a position with the springs 148 only slightly tensioned and the O-ring 110 seated in the groove 144 to thereby assemble the holder 96 and the stationary seal face 136 together as a unitary structure loosely disposed about the shaft 12 but centered relative thereto through the utilization of the centering bushing 126. The assembled holder 96 and stationary seal face 136 are then axially shifted toward the holder 56 and the rotary seal face 78 in order to engage the stationary seal face 136 with the rotary seal face 78. Movement of the holder 98 toward the holder 56 is continued while the springs 148 are compressed until the holders 56 and 96 and seal faces 78 and 136 are positioned as illustrated in FIG. 1. Then, the housing half 22 is engaged about the holders 56 and 96 with the locator pin 128 received in the recess 50 and the half 22 tightly abutted against the corresponding seal half 48. Thereafter, the second housing half 24 is engaged over the sides of the holders 56 and 96 opposite the half 22 and the bolts 42 are inserted and tightened.

As a result of the interlocking engagement of the rotary seal face halves within the halves of the holder 56 and the seal face 136 being yieldably secured within the holder 96, the entire assembly of the split seal assembly 10 may be carried out by a single work person, even when working in a confined area.

After the housing halves 22 and 24 have been tightly bolted together through the utilization of the four bolts 42, the mounting bolts 46 may be received through the mounting slots 44 and tightened securely within the stationary housing portion 14. The tightening of the bolts 46 serves to tightly compress the seal halves 48 between the housing portion 14, and the split gland housing comprising the housing halves 22 and 24.

The diametric planes in which the ends of the O-rings 110 and 114 are disposed are slightly displaced angularly relative to the diametric plane in which the sealing surfaces 130 are contained. In addition, the diametric plane in which the opposing ends of the split centering bushing 126 are disposed is also slightly displaced angularly relative to the diametric plane of the sealing surfaces 130.

The O-ring 76 seals the holder 56 relative to the shaft 12 and the O-ring 72 seals the holder 56 relative to the rotary seal face 78. The flat gasket 90 between the halves 58 and 60 forms a seal between the O-rings 76 and 72. Further, the flat gasket or seal 134 forms a seal between the O-rings 110 and 114.

Figure 9:
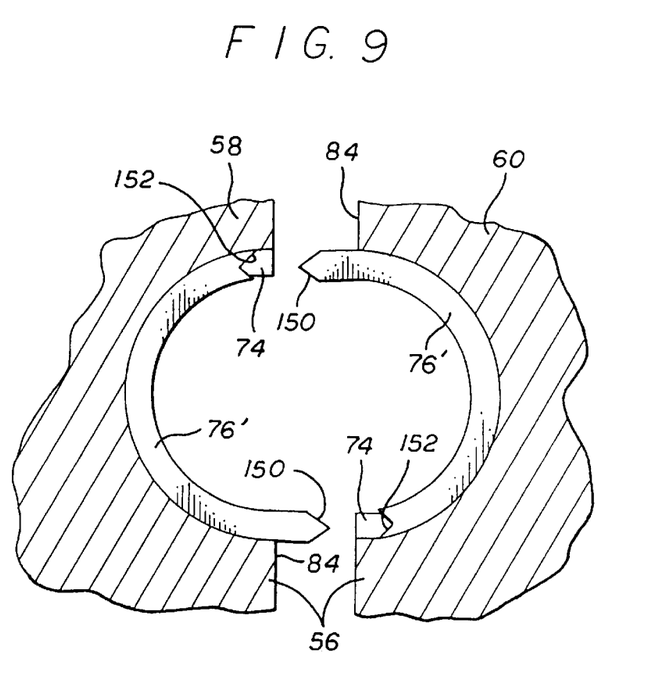
FIG. 9 is a vertical sectional view taken substantially upon a plane perpendicular to the longitudinal center line of the split seal assembly of FIG. 1, showing the O-ring halves and the rotary seal face holder halves in an unassembled condition.
Figure 10:
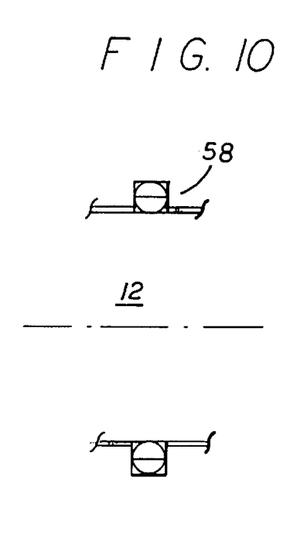
FIG. 10 is a side elevational view of one of the O-ring halves and its associated rotary seal face holder half of FIG. 9 as mounted on a shaft.

With reference now to FIGS. 9 and 10, a preferred split O-ring 76' of the present invention will now be described. The split O-ring 76' is located between the split seal face holder 56 and the shaft 12 (the shaft is omitted from FIG. 9 for clarity). The split O-ring 76' is preferably diametrically split resulting in two halves, each having a first end 150 and a second end 152. The first end is tapered, preferably having a V-cut, whereas the second end has a groove that closely corresponds to the shape of the tapered first end such that the ends match and provide a tight seal when the halves of the holder 56 are assembled. Alternatively, the ends of the O-ring may comprise matching conical surfaces, cylindrical surfaces, spherical surfaces or other types of matching surfaces having a mating fit. Preferably, the first end portion is fully received in the second end portion when the respective half annular segments are assembled and the first end portion does not increase in cross-section when progressing toward its end. In any event, the tapered first ends of the split O-ring protrude out from the mating surfaces of the rotary seal face at 84 while the second ends of the split O-ring, having the tapered grooves, are inset from the mating surfaces.

Preferably, split O-rings 72, 110 and 114, described above, have a similar construction as that of split O-ring 76'. In the case of split O-ring 72, the tapered first end preferably protrudes out from the mating surfaces of the rotary seal face holder half and the rotary seal face half. For split O-ring 110, the tapered first end protrudes out from the mating surfaces of the stationary seal face holder half and the stationary seal face half. For split C-ring 114, the tapered first end protrudes out from the stationary seal face holder half and the gland housing half.

By tapering the first end of each half of the split O-ring, the first ends can be guided into the groove 74 of the holder 56 with reduced frictional resistance and reduced fraying due to contact against the mating surfaces at 84. In the preferred embodiment, the O-ring is split into two halves diametrically. It will be appreciated, however, that the O-ring may have only one cut in it and still work suitably, provided the end of the O-ring protruding from the main surface of the holder is tapered. Preferably, the length of the O-ring is greater than the circumferential length of the groove in which the O-ring is placed such that the distance the tapered first end protrudes out from the mating surface is greater than the distance that the second end of the O-ring is inset into the other mating surface.

The seal face 78 is preferably made of material such as carbon graphite, graphite loaded silicon carbide or aluminum oxide (ceramic). The seal face 136 is preferably made of carbon. The centering bushing 126 is preferably constructed of carbon or carbon teflon and each of the O-rings may be constructed of a suitable O-ring material according to the temperature of the working environment and fluids to be sealed.

The O-ring 72 performs not only sealing functions but also serves to center the corresponding seal face member into position coaxial with the attendant holder and the shaft 12. Further, the O-ring also serves to frictionally resist rotation of the seal face member in the counterbore in which it is received.

The groove 144 is provided to resiliently maintain the seal face 136 properly centered and contained within the corresponding holder during relative axial shifting between the holder and the stationary seal face 78 throughout the final stages of installation of the split seal assembly.

It is to be noted further that the mating surfaces of the holder halves are disposed in diametric planes disposed substantially normal to the mating surfaces of the corresponding split gland housing halves.

In addition to the disclosed seal assembly 10 being constructed in a manner enabling its installation by a single work person even in a confined area, the seal assembly is constructed such that it can be installed reliably and be visually observed after assembly onto and around an associated shaft to determine that proper assembly has been performed.

Figure 11:
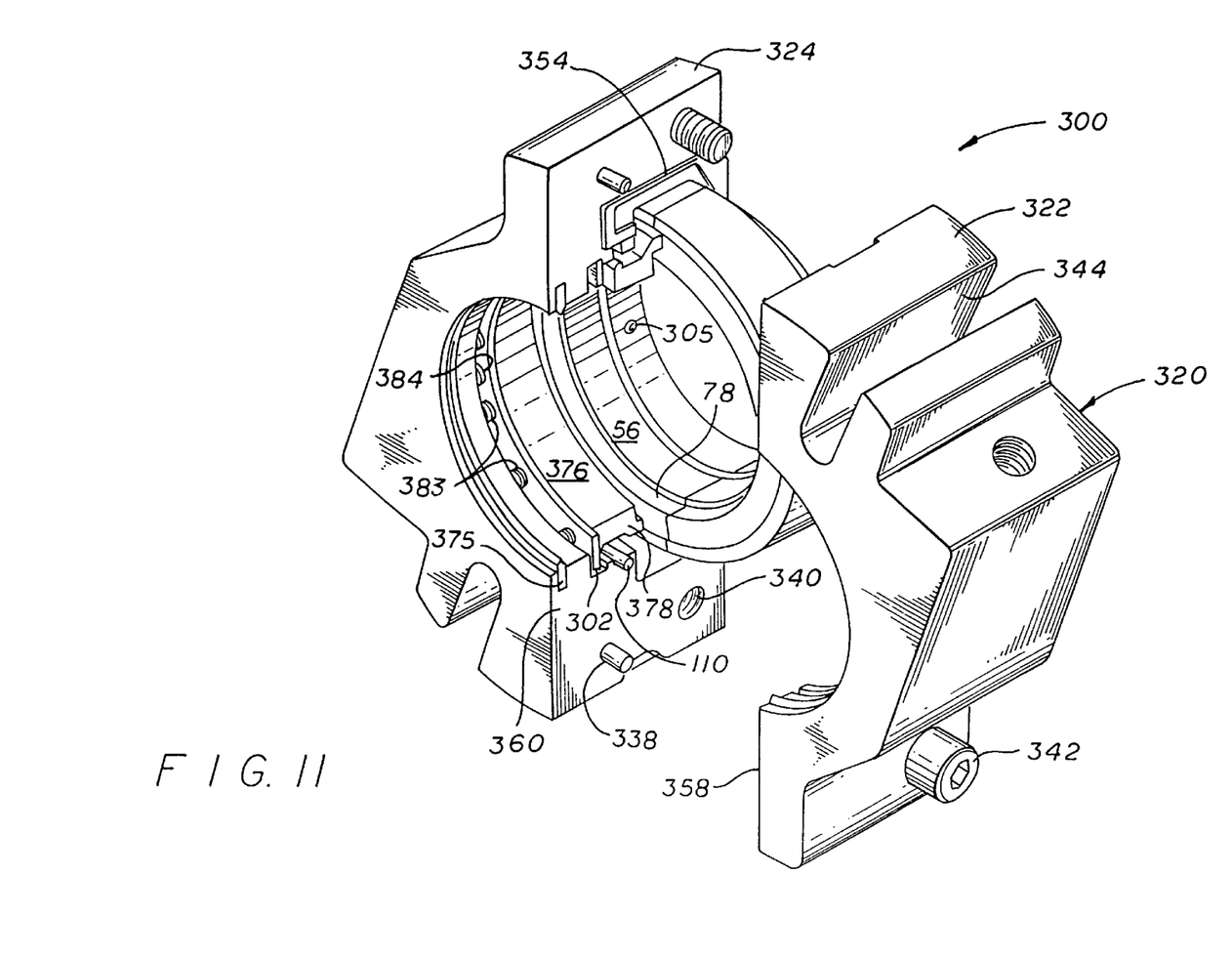
FIG. 11 is a perspective partially exploded view of an alternative split seal assembly of the present invention.
Figure 12:
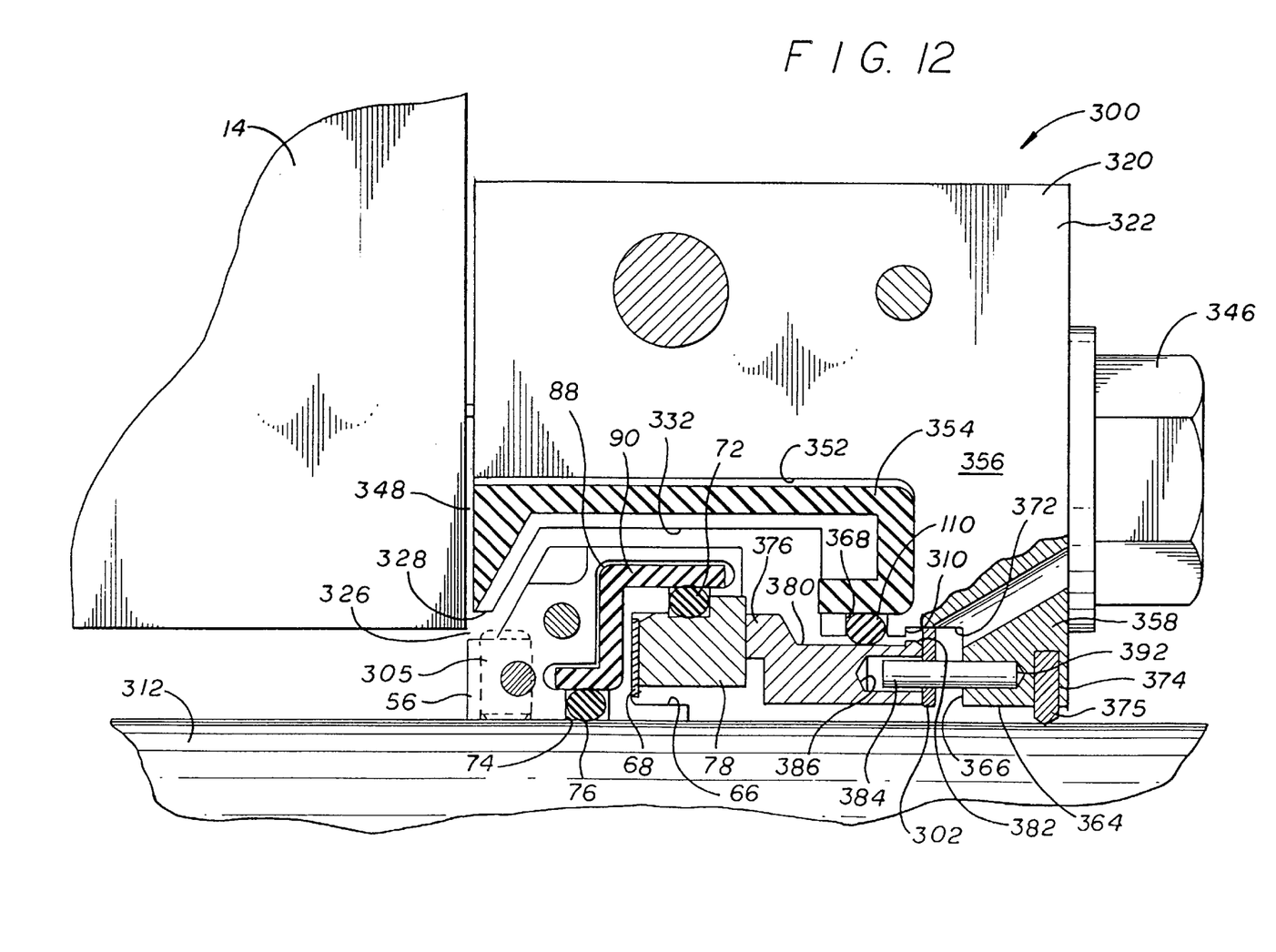
FIG. 12 is a vertical sectional view taken substantially along a plane passing through the longitudinal center line of the split seal assembly of FIG. 11.

With reference now to FIGS. 11 and 12, an alternative embodiment of a split seal assembly 300 is shown wherein the separate seal face holder for the stationary seal face is eliminated and retaining ring halves 302 are used to facilitate assembly and installation of the seal face assembly around the rotating shaft 312. The seal face holder 56 for the rotary seal face is identical in most pertinent respects to the seal face holder 56 described in connection with FIGS. 1–8 and therefore will not be described again. The O-ring seals 72, 76, 110 are identical in most pertinent respects to the O-ring seals 72, 76, 110 described in connection with FIGS. 1–10 and will not be described again.

In the split seal assembly 300, a split gland housing 320 is provided and includes two preferably identical halves 322 and 324 defining an opening 326 therethrough of a first small diameter as at 328 on the inner end thereof. The housing 320 defines an annular recess 332 for receiving the rotating seal face holder 56.

The halves 322 and 324 each include a pair of smooth bores 338 and a pair of threaded bores 340 equipped with counterbores. As shown in FIG. 11, capscrews 342 are utilized to tightly secure the halves 322 and 324 together. The halves 322 and 324 further include mounting slots 344 by which mounting bolts 346 may be used to tightly clasp the assembled housing 320 to the stationary housing portion 14, and expanded teflon cord 348 is clamped between the stationary housing portion 14 and the assembled split gland housing 320. In addition, one of the radial mounting faces of each housing half 322 and 324 includes a hook-shaped relieved area 352 in which a similar hook-shaped flat seal 354 is partially recessed for compressive sealing between the halves 322 and 324 when the latter are bolted together through the utilization of the bolts 342.

The split gland housing 320 further includes a stationary seal face holder or holder portion 356 which is diametrically split to form a pair of holder halves or holder portion halves 358 and 360. The halves 358 and 360 define a bore 364 formed therethrough including an inner end counterbore 366. The counterbore 366 includes a circumferential inwardly opening groove 368 in which the diametrically split O-ring seal 110 is received and a circumferentially inwardly opening recess 372 in which the retaining ring halves 302 are received.

Also, the holder 356 defines an inner circumferential groove 374 opening into the bore 364 and in which a diametrically split centering bushing 375 is seated. The centering bushing includes an inner periphery having a diameter substantially equal to the diameter of the shaft 312.

A stationary seal face 376 is provided. The seal face 376 is originally constructed in annular form, but is fractured along a diametric plane as at 378. The seal face 376 includes an axially extending cylindrical region 380 that terminates in a radially outwardly extending annular flange 382.

Each of the holder halves 358 and 360 includes a plurality of circumferentially spaced blind bores (not shown) opening into the counterbore 366 and having corresponding ends of a plurality of springs 383 seated therein. Further, at least one of the halves 358 and 360 includes a positioning pin 384 projecting outwardly therefrom and loosely slidably received through a hole in the retaining ring 302 and into an opposing blind bore 386 formed in the seal face 376 to thereby key the seal face 376 and the holder 356 against relative rotation. The seal face 376 initially is snugly received within the counterbore 366 to an extent with the O-ring seal 110 having its inner periphery removably seated against the annular flange 382 to thereby yieldably prevent removal of the seal face 376 from the holder 356.

It may be seen that the O-ring 110 provides a seal between the stationary seal face 376 and the holder 356. Furthermore, the O-ring 110 seals relative to the hook-shaped flat seal 354.

One of the advantages of the split seal assembly shown in FIGS. 11–12 is the ease of assembly and installation. To assemble the rotary seal face assembly, the Z-shaped compressible gaskets 90 are preferably cemented in the recesses 88 of the halves of the rotary seal face holder 56. One half of the split O-ring seal 76 is preferably seated and cemented into groove 74 of one of the holder halves. The other half of the split O-ring 76 is then placed in the groove of the other holder half and the two halves are placed together so that the O-ring seal halves meet. While holding the uncemented O-ring seal half in place, the two holder halves are separated and the uncemented O-ring seal half is cemented in place. The same procedure is used for securing the split O-ring seal 72 into the groove 70 of the two holder halves. Next, the teflon strips 68 are placed within the counterbore 66 of the holder 56.

To complete the rotary seal face assembly, the rotary seal face holder halves may be placed on a bench so the strips 68 face up and the halves of the split rotary seal face 78 are placed into the counterbore 66 of the holder 56. Preferably, the ends of each rotary seal face half are slightly offset relative to the diametric plane of the mating surfaces of the holder halves i.e., each seal face has an end that protrudes out from the diametric plane of its respective holder. Similarly, the O-ring seals 72, 76 may be cemented in place so that one end of each O-ring seal protrudes from the diametric plane of its respective holder. The two half assemblies are then positioned so the protruding O-ring seal ends fit into their respective O-ring grooves in the opposing half assembly and are carefully pressed together to avoid sliding along the break surfaces of the rotary seal face halves. Finally, the rotary face assembly is placed lap face down on a clean flat surface and pressure is applied to the assembly to seat the rotary seal face halves in the holder.

To assemble the stationary seal face assembly, the split gland housing halves 322, 324 are placed on a bench so spring holes face upward. The springs 383 are placed into the holes and the retaining ring halves 302 are placed onto the springs by pushing each half evenly against the springs until it can be slipped into the recess 372 in the gland housing. An end wall 390 of the recess 372 prevents the retaining ring halves from being displaced from the recess.

The positioning pin 384 is then inserted through each retaining ring half and tapped into a bore 392 in the gland housing. The centering bushing halves 375 are preferably cemented into their corresponding grooves 374 of the gland housing.

One half of the split O-ring seal 110 is preferably seated and cemented into the groove 368 of one of the halves 358, 360. The other half of the split O-ring seal 110 is then placed in the groove of the other holder portion half 358, 360 and the two holder portion halves are placed together so that the O-ring seal halves meet. While holding the uncemented O-ring seal ring in place, the two holder portion halves are separated and the uncemented O-ring seal half is cemented in place.

To complete the stationary seal face assembly, each stationary seal face half 376 is placed in the counterbore 366 so it contacts its respective retaining ring half 302 near the split on both sides. Tilting the stationary seal face half slightly will permit the stationary seal face half to clear the protruding lock pin 384. Pressure is then applied on the inside diameter of the stationary seal face half until the bore 386 of the seal face half aligns with the lock pin and then pressure is applied on the lapped face until the stationary seal face half snaps into place inside the O-ring seal 110.

The resultant rotating and stationary seal face assemblies each comprise two fully secure halves that fit around the rotary shaft like clam shells. The rotary seal face halves are held in place by the O-ring seal 72 within the counterbore of the holder 56 and the stationary seal face halves are held in place in the gland housing due to the positioning pin 384 and due to the interference between the O-ring seal 110 and the flange 382. The retaining ring 302 serves to hold the springs 382 securely in place as the stationary seal face halves are seated in place and during installation of the assembled halves around the shaft. At the time of installation, there are no loose parts. It is only necessary to mount the two halves of each assembly around the shaft.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

I claim:

1. A split mechanical face seal, comprising:

rotating and stationary split ring holders, each holder having opposing and remote axial ends, said opposing ends defining counterbores formed therein;

split rotating and stationary seal faces received in said counterbores of the rotating and stationary holders, respectively, and including opposing contacting seal surfaces;

resilient rotating and stationary mounting means mounting said rotating and stationary seal faces in said counterbores of the rotating and stationary holders, respectively, and biasing said rotating and stationary seal faces toward coaxial positions in said counterbores, said rotating and stationary mounting means at least yieldingly keying said rotating and stationary seal faces within said counterbores against axial withdrawal therefrom;

spring means in said stationary holder yieldingly biasing the stationary seal face outwardly of the stationary holder counterbore; and a separate diametrically split retaining ring between said springs and said stationary seal face and axially moveable relative to said stationary holder.

2. A split seal construction including rotating and stationary seal assemblies incorporating annular holders each including a pair of substantially half annular segments, said holders having opposing and remote axial ends, said opposing ends defining counterbores formed therein, substantially diametrically split rotating and stationary annular seal faces received in said counterbores of said rotating and stationary annular holders, respectively, a first diametrically split O-ring in said rotating holder counterbore sealing the outer periphery of said rotating seal face relative to the rotating holder, and a second diametrically split O-ring in the stationary holder counterbore sealing the outer periphery of said stationary seal face relative to the stationary holder, wherein at least one of said diametrically split O-rings includes a pair of O-ring halves, each O-ring half has a first end portion that is tapered and a second end portion that has a groove such that the end portions of the pair of O-ring halves, when assembled with the tapered ends inserted in the grooves, provide a tight seal at the end portions when the respective half annular segments are assembled and wherein the first end portions are fully received in the second end portions when the respective half annular segments are assembled and wherein each of said first end portions does not increase in cross-section when progressing toward its end.

3. A method of assembling and installing a split mechanical face seal around a shaft that extends from a housing, comprising:

assembling two rotary seal face assembly halves, wherein each rotary seal face assembly half includes a rotary holder half having first and second axial ends, said first end having a counterbore therein, and a rotary seal face half in said counterbore;

wherein assembling the two rotary seal face assembly halves includes securing each rotary seal face half within the counterbore of its respective rotary holder half prior to mounting the rotary seal face half around the shaft;

mounting the two assembled rotary seal face assembly halves to each other around the shaft such that the assembled rotary seal face assembly halves rotate with the shaft;

assembling two stationary seal face assembly halves, wherein each stationary seal face assembly half includes a stationary holder half having first and second axial ends, said first end having a counterbore therein, and a stationary seal face half in said counterbore;

wherein assembling the two stationary seal face assembly halves includes securing each stationary seal face half within the counterbore of its respective stationary holder half prior to mounting the stationary seal face half around the shaft;

mounting the two assembled stationary seal face assembly halves to each other around the shaft such that the rotary seal face halves are in opposed contacting relationship with the stationary seal face halves; and fastening the stationary holder halves to the housing.

4. The method of assembly of claim 3, wherein assembling the two rotary seal face assembly halves includes locating first resilient means in the counterbore of each rotary holder half to seal the respective rotary seal face half relative to the rotary holder half and to interfere with the respective rotary seal face half against axial withdrawal from its respective counterbore;

wherein assembling the two stationary seal face assembly halves includes locating second resilient means in the counterbore of each stationary holder half to seal the respective stationary seal face half relative to the stationary holder half and to interfere with the respective stationary seal face half against axial withdrawal from its respective counterbore; and wherein the two rotating seal face assembly halves are initially mounted around the shaft independently of the two stationary seal face assembly halves.

5. The method of assembly of claim 4, further comprising:

locating biasing means in the counterbore of each holder half of one of said rotary seal face assembly halves or said stationary seal face assembly halves to bias the respective seal face half outwardly of the respective holder half counterbore.

6. The method of assembly of claim 5, further comprising:

locating a retainer ring half between each biasing means and its respective seal face half.

7. The method of assembly of claim 6, further comprising:

securing a positioning pin to each holder half of said one of said rotary seal face assembly halves or said stationary seal face assembly halves and through the respective retainer ring half and into an opposing blind bore of the respective seal face half to hold the respective seal face half within the counterbore of the respective holder half.

8. The method of assembly of claim 6, wherein each seal face half of said one of said rotary seal face assembly halves or said stationary seal face assembly halves includes a radially outwardly extending flange; and wherein the assembling of said one of said rotary seal face assembly halves or said stationary seal face assembly halves includes locating each flange in axially interfering alignment with the respective one of said first or second resilient means.

9. The method of assembly of claim 6, wherein each holder half of said one of said rotary seal face assembly halves or said stationary seal face assembly halves includes a circumferentially inwardly opening recess having an end wall; and wherein the assembling of said one of said rotary seal face assembly halves or said stationary seal face assembly halves includes locating each retaining ring half in its respective recess such that the respective biasing means biases the retaining ring half toward the end wall and the end wall limits axial withdrawal of the retainer ring half out of the respective counterbore.

10. The method of assembly of claim 4, wherein the counterbore of each rotary holder half defines a first circumferentially inwardly opening groove, the counterbore of each stationary holder half defines a second circumferentially inwardly opening groove, the first resilient means is a diametrically split O-ring half located in the first circumferentially inwardly opening groove and the second resilient means is a diametrically split O-ring half located in the second circumferentially inwardly opening groove; and wherein locating the first and second resilient means includes cementing the O-ring half of at least one of said first and second resilient means into its respective circumferentially inwardly opening groove.

11. The method of assembly of claim 4, wherein the counterbore of each rotary holder half defines a first circumferentially inwardly opening groove, the counterbore of each stationary holder half defines a second circumferentially inwardly opening groove, the first resilient means is a diametrically split O-ring half located in the first circumferentially inwardly opening groove and the second resilient means is a diametrically split O-ring half located in the second circumferentially inwardly opening groove;

wherein the O-ring half of each rotary holder half has a tapered first end portion and a grooved second end portion;

wherein the grooved second end portion of the O-ring half of one rotary holder half closely corresponds in shape to the tapered first end portion of the O-ring half of the other rotary holder half and the grooved second end portion of the O-ring half of the other rotary holder half closely corresponds in shape to the tapered first end portion of the O-ring half of the one rotary holder half;

wherein locating the first resilient means in each rotary holder half includes locating the O-ring half of the first resilient means in the groove of each rotary holder half with the tapered first end portion protruding out of the rotary holder half and the grooved second end portion recessed within the rotary holder half such that when the rotary seal face assembly halves are assembled, the tapered first end portions are received in the grooved second end portions;

wherein the O-ring half of each stationary holder half has a tapered first end portion and a grooved second end portion;

wherein the grooved second end portion of the O-ring half of one stationary holder half closely corresponds in shape to the tapered first end portion of the O-ring half of the other stationary holder half and the grooved second end portion of the O-ring half of the other stationary holder half closely corresponds in shape to the tapered first end portion of the O-ring half of the one stationary holder half, and wherein locating the second resilient means in each stationary holder half includes locating the O-ring half of the second resilient means in the groove of each stationary holder half with the tapered first end portion protruding out of the stationary holder half and the grooved second end portion recessed within the stationary holder half such that when the stationary seal face assembly halves are assembled, the tapered first end portions are received in the grooved second end portions.

12. A method of assembling and installing a split mechanical face seal around a shaft that extends from a housing, comprising:

assembling two seal face assembly halves, wherein each seal face assembly half includes a holder half having first and second axial ends, said first end having a counterbore therein, and a seal face half in said counterbore;

locating biasing means in the counterbore of the holder half of each seal face assembly half to bias the respective seal face half outwardly of the counterbore;

locating resilient means in the counterbore of the holder half of each seal face assembly half to seal the respective seal face half relative to the holder half;

securing the seal face half of each seal face assembly half within the counterbore of its respective holder half prior to mounting said seal face half around the shaft; and mounting the two seal face assembly halves to each other around the shaft.

13. The method of assembly of claim 12, further comprising:

locating a retainer ring half between each biasing means and its respective seal face half.

14. The method of assembly of claim 13, further comprising:

securing a positioning pin to each holder half, through the respective retainer ring half and into an opposing blind bore of the respective seal face half to hold the respective seal face half within the counterbore of the respective holder half.

15. The method of assembly of claim 13, wherein the assembling of the seal face assembly halves includes locating each seal face half in axially interfering alignment with the resilient means.

16. The method of assembly of claim 13, further comprising:

wherein each holder half includes a circumferentially inwardly opening recess and an end wall; and wherein the assembling of the seal face assembly halves includes locating each retaining ring half in its respective recess such that the respective biasing means biases the retaining ring half toward the end wall and the end wall limits axial withdrawal of the retainer ring half out of the respective counterbore.

17. The method of assembly of claim 13, further comprising:

securing a positioning pin to each holder half, through the respective retainer ring half and into an opposing blind bore of the respective seal face half to hold the respective seal face half within the counterbore of the respective holder half, wherein each seal face half includes a radially outwardly extending flange and wherein the assembling of said seal face assembly halves includes locating each flange in axially interfering alignment with the respective resilient means; and wherein each holder half includes a circumferentially inwardly opening recess and an end wall and wherein the assembling of said seal face assembly halves includes locating each retaining ring half in its respective recess such that the respective biasing means biases the retaining ring half toward the end wall and the end wall limits axial withdrawal of the retainer ring half out of the respective counterbore.

18. The method of assembly of claim 17, further comprising:

fastening the two seal face assembly halves to the housing such that the holder halves are stationary relative to the housing.

19. The method of assembly of claim 12, wherein the counterbore of each holder half defines a circumferentially inwardly opening groove, and the resilient means is a diametrically split O-ring half located in the circumferentially inwardly opening groove and wherein locating the resilient means includes cementing at least one O-ring half of the resilient means into the circumferentially inwardly opening groove.

20. The method of assembly of claim 12, wherein the counterbore of each holder half defines a circumferentially inwardly opening groove and the resilient means is a diametrically split O-ring half located in the circumferentially inwardly opening groove;

wherein the O-ring half of each holder half has a tapered first end portion and a grooved second end portion;

wherein the grooved second end portion of the O-ring half of one holder half closely corresponds in shape to the tapered first end portion of the O-ring half of the other holder half and the grooved second end portion of the O-ring half of the other holder half closely corresponds in shape to the tapered first end portion of the O-ring half of the one holder half; and wherein locating the resilient means in each holder half includes locating the O-ring half of the resilient means in the groove of each holder half with the tapered first end portion protruding out of the holder half and the grooved second end portion recessed within the holder half such that when the seal face assembly halves are assembled, the tapered first end portions are received in the grooved second end portions.

21. A split mechanical face seal assembly for mounting around a shaft, comprising:
   two holder halves, each of said two holder halves having first and second axial ends, each first end defining a counterbore formed therein;
   a seal face half received in the counterbore of each of said two holder halves;
   resilient mounting means in the counterbore of each of said two holder halves to seal the respective seal face half relative to its holder half;
   means in the counterbore of each of said two holder halves biasing the seal face half outwardly of its counterbore;
   a separate split retainer ring half located between and engaging each biasing means and its respective seal face half; and
   means for securing the two holder halves to each other around the shaft.

22. The split mechanical face seal assembly of claim 21, wherein the resilient mounting means interferes with the respective seal face half against axial withdrawal from its counterbore.

23. The split mechanical face seal assembly of claim 22, further comprising a positioning pin secured to each of said two holder halves through the respective retainer ring half and into an opposing blind bore of the respective seal face half to hold the respective seal face half within its counterbore.

24. The split mechanical face seal assembly of claim 22, wherein each of said two holder halves includes a circumferentially inwardly opening recess and an end wall and the retaining ring half of each of said two holder halves is located in its respective recess such that the respective biasing means biases the retaining ring half toward the end wall and the end wall limits axial withdrawal of the retainer ring half out of the respective counterbore.

25. The split mechanical face seal assembly of claim 22, further comprising a positioning pin secured to each of said two holder halves through the respective retainer ring half and into an opposing blind bore of the respective seal face half to hold the respective seal face half within its counterbore; and
   wherein each of said two holder halves includes a circumferentially inwardly opening recess and an end wall and the retaining ring half of each of said two holder halves is located in its respective recess such that the respective biasing means biases the retaining ring half toward the end wall and the end wall limits axial withdrawal of the retainer ring half out of the respective counterbore.

26. The split mechanical face seal assembly of claim 21, wherein the seal face half of each of said two holder halves includes a radially outwardly extending flange in axially interfering alignment with its respective resilient mounting means.

27. The split mechanical face seal assembly of claim 21, wherein the counterbore of each of said two holder halves defines a circumferentially inwardly opening groove and the resilient mounting means is a diametrically split O-ring half located in the circumferentially inwardly opening groove;
   wherein the O-ring half of each of said two holder halves has a tapered first end portion and a grooved second end portion;
   wherein the grooved second end portion of the O-ring half of one of said two holder halves closely corresponds in shape to the tapered first end portion of the O-ring half of the other of said two holder halves and the grooved second end portion of the O-ring half of the other of said two holder halves closely corresponds in shape to the tapered first end portion of the O-ring half of the one of said two holder halves; and
   wherein the O-ring half of each of said two holder halves is located in its respective groove with the tapered first end portion protruding out of the respective holder half and the grooved second end portion recessed within the respective holder half such that when the two holder halves are assembled, the tapered first end portions are received in the grooved second end portions.

28. A split mechanical face seal assembly for mounting around a shaft, comprising:
   two holder halves, each of said two holder halves having first and second axial ends, each first end defining a counterbore formed therein;
   a seal face half received in the counterbore of each of said two holder halves;
   resilient mounting means in the counterbore of each of said two holder halves to seal the respective seal face half relative to its holder half;
   means for securing the two holder halves to each other around the shaft;
   wherein the counterbore of each of said two holder halves defines a circumferentially inwardly opening groove and the resilient mounting means is a diametrically split O-ring half located in the circumferentially inwardly opening groove;
   wherein the O-ring half of each of said two holder halves has a tapered first end portion and a grooved second end portion;
   wherein the grooved second end portion of the O-ring half of one of said two holder halves closely corresponds in shape to the tapered first end portion of the O-ring half of the other of said two holder halves and the grooved second end portion of the O-ring half of the other of said two holder halves closely corresponds in shape to the tapered first end portion of the O-ring half of the one of said two holder halves; and
   wherein the O-ring half of each of said two holder halves is located in its respective groove with the tapered first end portion protruding out of the respective holder half and the grooved second end portion recessed within the respective holder half such that when the two holder halves are assembled, the tapered first end portions are received in the grooved second end portions.

29. The split mechanical face seal assembly of claim 28 wherein the tapered first end portion that is received in the respective grooved second end portion does not increase in cross-section when progressing toward its end.

30. The split mechanical face seal assembly of claim 28, wherein the tapered first end portion of each O-ring half is V-cut.

* * * * *